Sept. 13, 1966   H. F. MEYER   3,273,023
SELECTOR CIRCUIT

Original Filed Feb. 20, 1961   2 Sheets-Sheet 1

INVENTOR.
HENRY F. MEYER
BY Woodling, Krost,
Granger and Rust
ATTORNEYS

Sept. 13, 1966     H. F. MEYER     3,273,023
SELECTOR CIRCUIT

Original Filed Feb. 20, 1961    2 Sheets-Sheet 2

INVENTOR.
BY HENRY F. MEYER
ATTORNEYS

United States Patent Office 3,273,023
Patented Sept. 13, 1966

3,273,023
SELECTOR CIRCUIT
Henry F. Meyer, Cortland, N.Y., assignor to The Monarch Machine Tool Company, a corporation of Ohio
Continuation of application Ser. No. 90,505, Feb. 20, 1961. This application Sept. 25, 1964, Ser. No. 399,233
11 Claims. (Cl. 317—134)

This application is a continuation of my application, Ser. No. 90,505, now abandoned, filed Feb. 20, 1961.

This invention relates in general to control circuits and, more particularly, to control circuits for use with tool pools or tool storage means for a plurality of tools which may be used with a machine tool. The control circuit is useable to control the selected operation of a controllable device which, for purposes of illustration, may be a machine tool.

Heretofore devices have been provided in machine tool operating machines for directing the positioning of objects to be worked upon by one or more tools in a pre-planned or scheduled operation. Such a device may comprise a manually operated directing device, or a coded or memory device which may be operated in conjunction with correlative electrical control circuits for energizing suitable motors which actuate the positioning equipment. These devices serve to eliminate personal errors which result from mis-locating the part to be tooled, but they do not provide positive assurance that the particular tool will be used which is scheduled for the instant operation. For example, in a boring machine operation where for a scheduled bore a series of different tools are to be used to turn out the finished job, such as a boring tool, a reamer and a threading tap, there is need for assurance that all these tools will be used in the order named. A careless or unreliable attendant might omit the use of the reamer and still produce a threaded bore, but without the reaming operation the ostensibly finished job would be defective and subject to rejection.

Accordingly, it is among the objects of the present invention to provide a control circuit which will secure the selection of actuation of a proper switch and this switch may be actuated by insertion or removal of a tool from a tool storage means.

Another object of the invention is to provide a control circuit wherein one selector switch must be actuated and all the other selector switches of a given plurality must be unactuated before a given control circuit function will be accomplished.

Another object of the invention is to provide a control circuit wherein a shunt circuit is established around an actuated open contact means of a selector switch in order to provide an energization circuit for a controllable device.

Another object of the invention is to provide a control circuit with a plurality of series connected contact means of a plurality of selector switches with these contact means normally being closed in the circuit as utilized, and with one of these contact means selectively being open and establishing a shunt circuit therearound to provide energization for a controllable device.

Another object of the invention is to provide means for controlling the use of a scheduled tool, or a series of scheduled tools in a pre-planned operation of a tool operating machine.

Another object is to provide means for preventing a tool operating machine from being started until, or unless a pre-planned tool for a given operation is selected therefor.

A further object is to provide a tool rack, storage means or pool for tools which are to be used in a scheduled operation, wherein a sole and individual receptacle is provided for each tool, wherein a signal is provided to indicate the tool to be used, and wherein the machine tool may not be energized to carry out the intended operation unless, or until all the tools of the pool are in their proper places, except the one to be used in the instant operation, and the latter tool has been removed from the rack.

These and other objects of the invention will be more fully understood from the following description which will be made with reference to the accompanying drawings in which like numerals designate like parts, and in which FIGURE 1 is a partial side elevational view of a tool rack or pool which provides accommodation for as many as nine tools;

Figure 4:
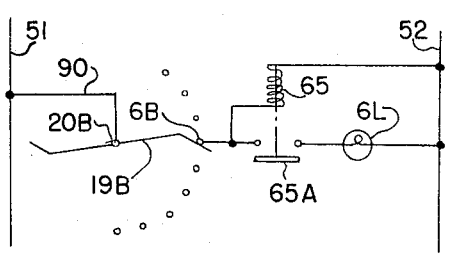
Figure 5:
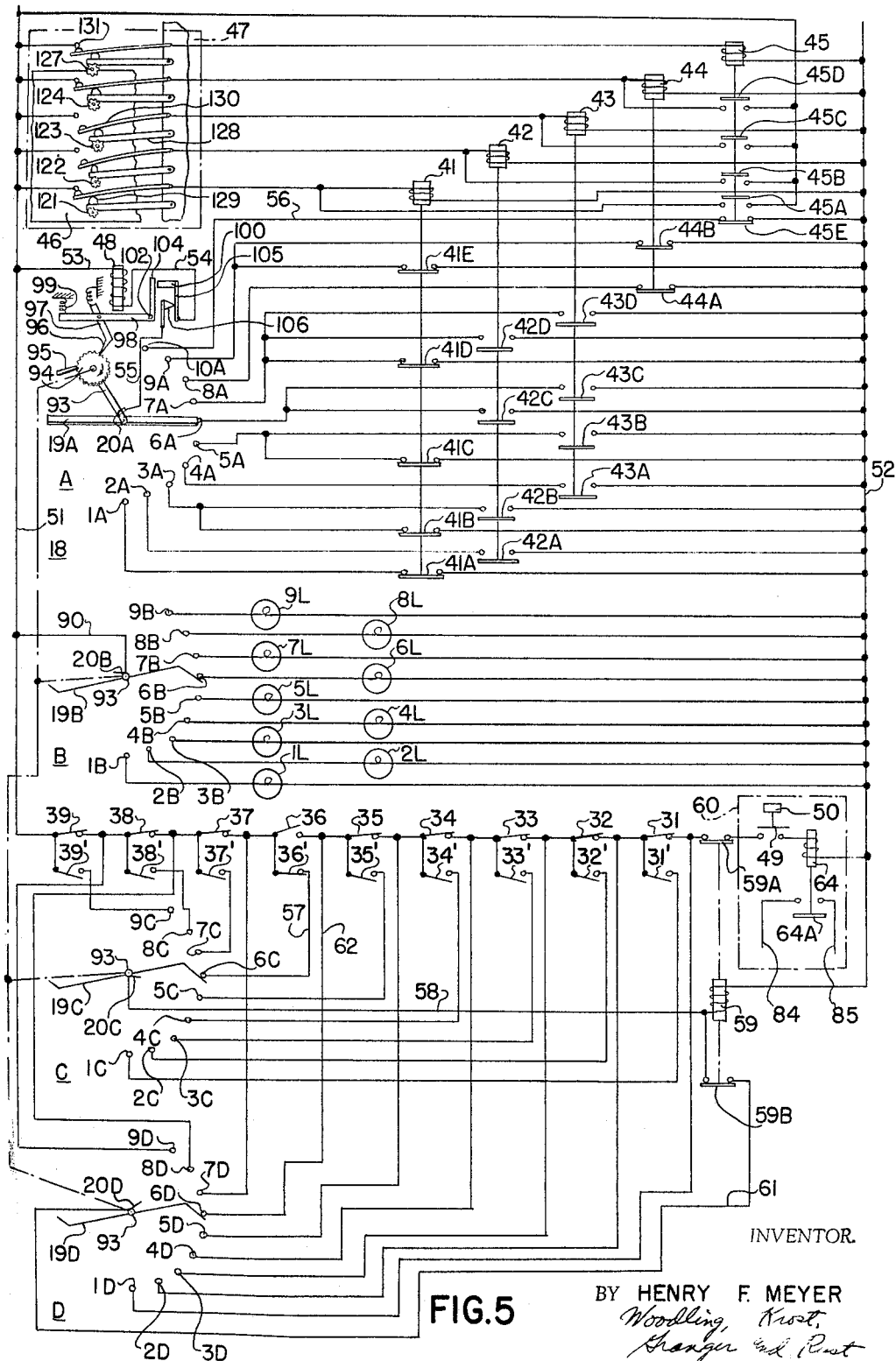

FIGURE 4 is a schematic representation of a lamp connection in bank B of the stepping switch, showing the arrangement of a stepping switch contact, a time delay switch and the lamp which is lighted when the tool to be used is selected; and, FIGURE 5 is a schematic representation of one embodiment of the invention which comprises an arrangement of electrical connections existing when tool No. 6, as designated herein, is selected for use and is removed from the rack.

The objects of the invention are attained in general by providing the combination of a tool pool, depot or rack having suitable electrical connections and switches for closing one part of a selected circuit when the tool to be used in a pre-planned operation is removed from the tool rack; an adjustable four bank multiple contact stepping switch or gang switch means in which one bank is a contact selecting first bank to select a circuit corresponding to a given tool, said circuits being provided with solenoid or relay operated switches for opening and closing the same; a coded memory device correlated to the latter circuits which is arranged to control the energization of said relays individually; a suitably connected motor for controlling the operation of the stepping switch and for moving it into different positions corresponding to the several tools to be used in response to the memory device; means in a second bank of the stepping switch for indicating the tool to be used in the coded operation; a third bank of the stepping switch controlling electrical connections to a power operated master switch and a master supplemental switch; and a series of contacts in a fourth bank of the stepping switch for closing selected shunt circuits.

Figure 3:
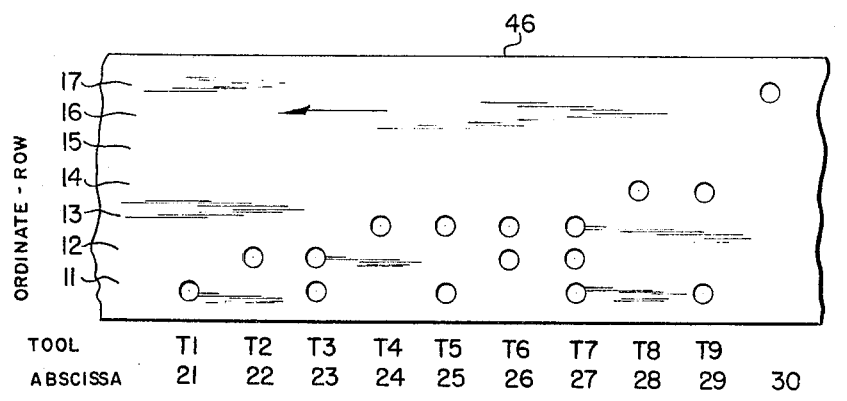
FIGURE 3 is a top plan view of a section of a memory device in the form of a tape which is perforated in accordance with a scheme herein represented, and which may be utilized in the manner hereinafter to be described for initiating the operation of the device.

In operation, the invention comprises advancing the memory device, such as the coded perforated tape 46 shown in FIGURE 3, into a scanning station where a scanning device, or reader 47 operates to open a pre-arranged relay 41–44 circuit, or combination of relay circuits which correspond to the tool to be used in the instant operation. Where a coded perforated tape 46 is used as the memory device, the horizontal rows of perforations correspond to the relay circuits and the vertical columns correspond to the different tools T1 through T9, respectively. One more horizontal and vertical position may be provided on the tape for a zero position which represents the starting or homing position (FIGURE 5) of the stepping switch at the beginning of an operation. For example, FIGURE 3 shows how the tape may be coded for selecting the nine tools in numerical order. The first through seventh ordinates are designated by reference numerals 11 through 17, respectively. The first through tenth abscissas are designated by reference numerals 21 through 30, respectively. The circuit for the first tool T1 may be coded in the first abscissa position 21 by perforating the tape once in the first ordinate position 11. The second tool T2 is shown coded in the second abscissa position 22 by a perforation in the second ordinate position 12. The third tool T3 is shown coded in the third abscissa position 23 by perforations in the tape in both the first and second ordinate positions 11 and 12. The fourth tool T4 is coded by a perforation in the third ordinate position 13, and so on according to a binary code. The sixth tool T6 is shown coded in the sixth abscissa position 26 by perforations in both the second and third ordinate positons 12 and 13. The starting code on the tape for homing the stepping switch after a tooling operation is completed may be a single perforation in the seventh ordinate position 17 and this is shown in the tenth abscissa position 30. This homing position will select the starting position of the stepping switch 18 when the relay 45 (FIGURE 5) is caused to be deenergized and the contacts 45E of the relay are opened.

The stepping switch 18 may be considered gang switch means and has four banks, A, B, C and D. These four banks may be considered a contact position selecting bank A, a tool indicator bank B, a master switch bank C and a shunt circuit bank D.

The stepping switch 18 has a motor or solenoid coil 48 actuating an armature 98. The stepping switch also includes a scanning wheel 94 which is engaged by a scanning wheel detent 95 to assure only unidirectional rotation of the scanning wheel 94, in the clockwise direction shown by the arrow. The armature 98 carries a pawl lever 97, in turn carrying a pawl 96 for engaging the scanning wheel to provide the unidirectional rotation by one step each time the armature 98 is actuated.

The solenoid coil 48 is connected in a circuit which includes the first and second leads 51 and 52 which may be the supply conductor and the return conductor from a suitable power supply source, not shown. This may be a direct current source or it may be an alternating current source if alternating current relays are used.

The stepping switch armature 98 is pivoted at 102 and a spring 99 urges the armature 98 away from the solenoid coil 48. An armature extension 104 actuates an insulated button 100 of a normally closed interrupter switch formed by a spring blade 105 and a contact 106, with the insulated button carried on the spring blade 105. Each gang of the stepping switch has a wiper arm 19A–19D, respectively, carried on the shaft 93 of the stepping switch 18. Each wiper arm 19A–19D is insulated from the shaft 93 and is electrically in engagement with a brush 20A–20D, respectively. The solenoid coil 48 is connected to the first lead 51 by a conductor 53 and is connected through a lead 54 to the interrupter switch 105–106. The contact 106 is connected by lead 55 to the brush 20A. Each wiper arm 19A–19D in the respective banks of the stepping switch is adapted to electrically engage ten different contacts numbered 1 through 10. These have the suffix A, B, C and D in the respective banks A, B, C and D. If the wiper arm 19A is at the contact point 10A and the relay contact 45E is open, then this will de-energize the motor or solenoid coil 48 of the stepping switch 18. The energization circuit for this solenoid coil 48 is from leads 51 to 52 by way of conductor 53, lead 54, interrupter switch 105–106, lead 55, brush 20A, wiper arm 19A, contact 10A and conductor 56 through relay contact 45E.

Accordingly, if there is a perforation in the tape in the seventh ordinate position 17, as shown in FIGURE 3, this will cause stepping switch 18 to return to the homing or starting position.

The wiper arms 19A–19D may be considered to be movable devices in the gang switch banks A, B, C and D to sequentially engage the contacts in the respective banks. There are a given plural number of tools selectable by the present circuit, and each gang switch bank has contacts equal in number to said given plural number. In this case nine tools are selectable and nine contacts are used in each switch bank. Additionally, a tenth switch contact 10A is used in the first switch bank A for returning the stepping switch to the starting position. At the start of a stepping switch indexing operation the switch contact 45E is closed, either manually or by means hereinafter described.

In practice the scanning device 45 needs as many scanning units as there are ordinate positions coded on the tape. Seven ordinate positions are shown in the illustration of FIGURE 3. However, in this example of only nine tools, only five scanning devices are needed and these are shown in FIGURE 5, the same being those corresponding to the relays 41–45. These relays control contacts according to a binary code in bank A of the stepping switch.

FIGURE 5 illustrates the disposition of parts and condition of the circuit when the use of the sixth tool T6 is selected by the tape 46. Thus, in the first bank A, relay contacts 42C and 43C are open and the corresponding relays 42 and 43 are de-energized. These relay contacts 42C and 43C open all connections between the sixth contact 6A and the lead 52. The other relays 41 and 44 are energized, and the relay contacts thereof are closed.

Figure 1:
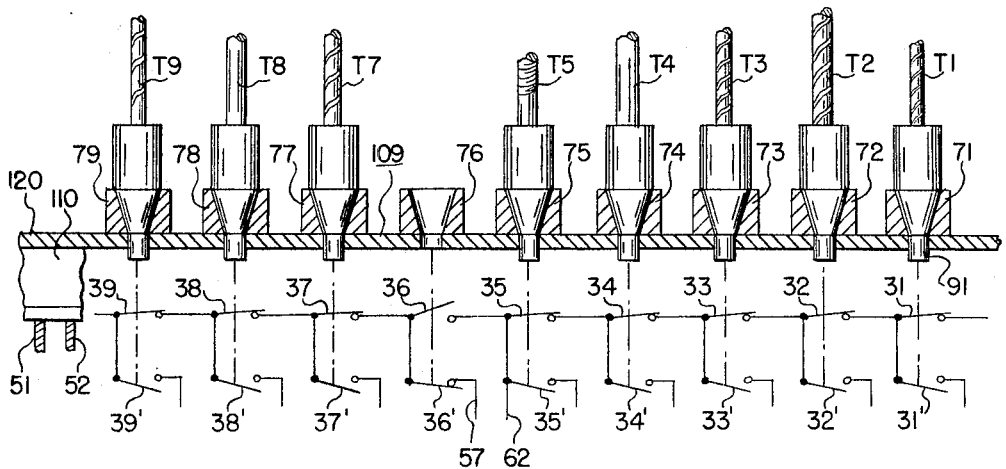

In the operation illustrated in the drawings, the sixth tool T6 is selected for use and is absent from the tool rack 109 (FIGURE 1). As will be more fully explained hereinafter the dwell or selection position for any tool such as tool T6 is the completely open or absence-of-connection in the group of conductors through the contacts of relays 41–44 in level A (FIGURE 5). As shown, the contact 6A in bank A is connected to relay contacts 42C and 43C which are open at this time, and this de-energizes the stepping switch solenoid coil 48 to stop the stepping movement at the selected position, in this case for tool T6. All wiper arms 19A–19D stop in engagement with the respective sixth contact 6A–6D.

It will be seen by reference to the perforated tape 46 (FIGURE 3) that in order to control the illustrated system, there must be a total of nine different combinations in the control bank A in order to form a sufficient number of combinations of circuits which are different. These nine combinations are correlated by the sixteen perforations shown in FIGURE 3, each of which is in a different position on the tape. Thus, there are five contacts 41A–41E on relay 41 distributed relatively like the five perforations in the first horizontal row or ordinate 11 of the tape 46. There are four contacts 42A–42D on relay 42 spaced in the second horizontal row or ordinate 12 of the tape located so that different combinations of perforations will be opposite the several tool positions represented by the abscissas in the tape of FIGURE 3. There are four contacts 43A–43D on relay 43 and two contacts 44A and 44B on relay 44. Also, there is relay contact 45E corresponding to the seventh ordinate position 17. The latter is a special position to provide for a starting position of the stepping switch at the beginning of an operation. The different combinations of connections in the switch bank A which correspond to the related perforations coded on the tape provide a binary code to decimal code conversion to make the stepping switch stop at the correct one of nine selectable positions. Accordingly, when the stepping switch 18 is rotated by the indexing motor 48 in a clockwise direction, as indicated by the arrow in FIGURE 5, the dwell or tool selection will take place on the contact point 6A where relay contacts 42C and 43C are open.

When the open circuit position for tool T6 has thus been found, the wiper 19B in indicator switch bank B is turned to the corresponding contact point 6B, as shown in FIGURE 5 and will close a connection which energizes an indicator, such as a lamp 6L of lamps 1L–9L, which may be desirably located opposite tool T6 in the rack 109 to indicate that tool T6 is the one to be removed from the tool rack and used in the instant operation. As will appear hereinafter, the machine tool cannot be started unless, or until tool T6 is removed from the rack and all other tools are in their proper places, when the use of tool T6 is selected by the tape 46.

The tool rack 109, as illustrated in FIGURE 1, has positions for the nine tools T1–T9 and each tool actuates a switch. This may be a single pole, double throw switch or it may be two separate switches. The switches include first contact means 31–39 and second contact means 31′–39′, respectively, for the tools T1–T9. As shown, the first contact means are normally open contacts and the second contact means are normally closed contacts. As used in this circuit however, the normally open first contacts 31–39 are closed by insertion of the proper tool T1–T9 in the tool rack 109 and at the same time, this opens the corresponding second contact means 31′–39′.

In switch bank C the wiper arm 19C is caused to rest on a sixth contact point 6C which closes a connection from lead 51 through the tool-closed first contact means 39, 38, 37, switch 36′ which is closed when tool T6 is removed from the rack, lead 57, contact 6C, wiper arm 19C, lead 58, the coil of master switch relay 59 to lead 52. The energization of relay 59 causes the normally open relay contacts 59A and 59B to close. Relay contact 59A may be considered a master starter switch and relay contact 59B may be considered a master supplemental switch. Provided tool T6 is removed from the rack, switch 36′ is closed by said removal and provided tools T7 to T9 are in place in the rack, then a closed circuit between leads 51 and 52 is formed from the lead 51 through the normally closed switches 39, 38 and 37, closed switch 36′ which is closed by the removal of tool T6 and lead 57 to the switch contact 6C. If however tool T6 is not removed from the tool rack, the switch 36′ will not be closed and the relay 59 consequently cannot be energized. The switch contacts 59A and 59B will remain open so that a controllable device 60 will remain inoperative and unenergizable. The latter effect will likewise result if all the tools from T1 to T5 or all the tools from T7 to T9 are not properly seated in their respective places so that switch contacts 31 to 35 or switch contacts 37 to 39 in the illustration will not be closed, as will presently appear.

Similarly, wiper arm 19D in the shunt circuit switch bank D will rest on a corresponding sixth contact point 6D and close a bridging connection which bridges the switch connection that is broken by the opening of switch 36 when tool T6 is removed from this rack 109. This bridging circuit comprises lead 57, contact 6C, wiper arm 19C, lead 58, relay contact 59B, lead 61, wiper arm 19D, contact 6D and lead 62. When tool T6 is removed from the rack and all other tools are seated in their proper positions, a closed circuit will then be established from the lead 51 through the switch first contact means 39, 38, 37, switch 36′, lead 57, contact 6C, wiper arm 19C, lead 58, recently closed switch contact 59B, lead 61, wiper arm 19D, contact 6D, lead 62, the series connection through switches 35 to 31 and to the closed master switch contact 59A, all of which provides a live circuit to the controllable device 60. This controllable device 60 may include a starter button 50 having starter button contacts 49 and a relay 64 having normally open relay contacts 64A. The contact 64A may be connected in leads 84 and 85. This circuit may be closed thereafter by manually operating the starter button 50 to energize the power switch relay 64. When the operator manipulates the starter button 50, the live circuit will be closed through the switch contacts 49 and relay 64 whereby power switch contacts 64A will close the power supply lead 84 to lead 85 for starting the operation of the machine tool, as an example of a controllable device. The power circuit 84–85 may be used in various ways, such as that of empowering the machine tool driving motor, to close a clutch operating solenoid for effecting the operation, or energization of any other device whereby the machine tool will be caused to operate. Switch bank D and its connections are provided so as to be assured that tools T1 to T5 are all in their proper receptacles, even though tool T6 is removed from its receptacle and all other tools are in order. In case all tools T1 to T5 are not in order the necessary series circuit through switches 35 to 31 and switch contacts 59A will be broken, and an attempted energization of the relay 64 will be ineffectual.

In the lamp circuits of switch bank B the insertion of time delay switches is optional. Without time delay switches in the lamp circuits the lamps will flash as corresponding contacts are made with the several contact points, but when a suitably timed delay switch is inserted in each lamp circuit, only the tool indicating lamp, or other indicator for the tool to be used will become active. The connection in which a time delay switch is utilized in the lamp circuit is illustrated in FIGURE 4. When the stepping switch is made to dwell on a given contact point, such as contact point 6B in bank B, a circuit will be established from lead 90 through wiper arm 19B, contact 6B, time delay relay 65 to lead 52. Resultantly the normally open indicator relay contacts 65A will be closed after a short time delay, and lamp 6L or other tool indicator will be energized through the resulting closed circuit to the lead 52.

The switch contacts 45E in the lead 56 may be arranged to be closed manually after the stepping switch has been indexed to the starting position shown in FIGURE 5, or it may be closed automatically by including in the memory system a special tape perforation and a scanning device operable to close the circuits of relay 45 across the leads 51 and 52. In any event, the connection from contact 45E to lead 52 must be closed in order that the stepping switch solenoid coil 48 may be rendered operative at the start of an indexing cycle; and the same connection must have been opened in order that the stepping switch motor 48 may be rendered inoperative after the finish of a tool operation, when the stepping is caused to be indexed to the starting position.

Figure 2:
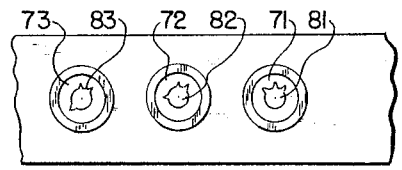
FIGURE 2 is a partial top plan view of the rack illustrating the individual receptacles for the tools.

The tool rack 109 (FIGURE 1) comprises an elongated top plate 120 and enclosure within which the tool selector switches with contacts 31 to 39 and 31′ to 39′ are mounted. The stepping switch 18 may be mounted in any convenient place, such as at housing 110 at the left end of the enclosure near the selector switch 39, and the power supply leads 51 and 52 may be brought out through the casing, or otherwise conveniently arranged. The tool receptacles 71 to 79 are secured to the top plate 120 of the elongated enclosure and receive a chuck to hold the individual tools. Key-ways are formed in the lower cylindrical extensions thereof, such as the variously notched openings or slots 81–83 for the corresponding receptacles 71–73 illustrated in FIGURE 2. The stems or shanks of the tool holders, such as stem 91 are machined to fit the differently formed openings or slots in a manner such as that in which keys are made to fit complementary key ways in locks, so that in order that tool T1, for example, may manipulate its corresponding microswitch 31, 31′, it must be inserted in receptacle 71 which is the only receptacle with a keyway 81 formed to permit this tool to be inserted to close switch contact 31 and open its companion switch contact 31′. When a tool is removed from the rack 109, for example tool T6 from receptacle 76, the microswitch contact 36 is opened and microswitch contact 36′ is closed as illustrated in FIGURES 1 and 5.

A suitable scanning device 47 is illustrated in FIGURE 5 and comprises as many scanning wheels as there are horizontal rows of perforations in the tape or memory device, in the present illustration there are seven rows; but for this illustration of only nine tools only four wheels are needed for the tool selection plus a fifth scanning wheel for the homing position. In FIGURE 5, scanning wheels 121, 122, 123, 124 and 127 are shown and are aligned to cooperate with the perforations in the first, second, third, fourth and seventh rows of the memory device 46. As the tape is advanced in the direction of the arrow shown in FIGURE 3, the tape perforations move into the reading position underneath the scanning wheels. The scanning wheels have elongated radially and outwardly extending fingers which are sufficiently slim to drop through the perforations in the tape, and do so when a finger and a perforation in the tape coincide. For example, when the memory tape is displaced longitudinally so that a perforation is aligned with a finger of wheel 123, the finger drops into the perforation, thereby lowering the wheel-end of the respective lever 128 upon which the wheel 123 is mounted to rotate and wheel along the surface of the tape. Each lever 128 has an insulated projection 129 above the wheel which bears upwardly on the respective spring contact member 130 for permitting the contact member 130 to move downwardly out of engagement with the respective contact point 131 when the wheel 123, lever 128 and spring contact 130 are depressed.

Thus when the scanning wheel reads the intelligence stored on the tape by dropping into the aligned perforation, the normally closed and normally energized relay circuit corresponding to a certain horizontal row of intelligence records, such as the third row 13 of the tape, is de-energized. In the example chosen of selection of tool T6, scanning wheels 122 and 123 have dropped into tape perforations, to de-energize both relays 42 and 43. This opens all relay contacts thereof. In the first, second and seventh rows of the tape there are no perforations in the reading position illustrated in FIGURE 5. Consequently, scanning wheels 121, 124 and 127 remain upon the surface of the tape, the corresponding relay circuits remain in their normally closed condition and relays 41, 44 and 47 remain energized.

When a particular tool operation is completed and a new tool is to be selected, upon tape advance toward the next intelligence point, movement of the tape will lift the scanning wheels 122 and 123 to energize relays 42 and 43. This starts movement of the stepping switch 18 by energization of the solenoid coil 48. When a perforation in the tape in the seventh row 17 of the tape is encountered by the scanning wheel 127, this will operate in the manner just described to de-energize relay 45 and open contact 45E to stop the stepping switch 18 in the starting position. The relay 45 has normally closed contacts 45A–45D, connected in parallel with the contacts 130–131 of the respective scanning wheels 121–124. When relay 45 is de-energized, these contacts 45A–45D close to make certain the relays 41–44 are all energized, so that the stepping switch 18 will not stop until it reaches the homing or starting position. In this condition the stepping switch is in position to receive the next reading sent out by the memory device, at which time and in which position of the tape the scanning wheel 127 will again be wheeling along the surface of the tape and relay 45 will be energized, and some one or more of the other scanning wheels will encounter coded perforations.

If desired other intelligence may be stored on the memory device, such as directions for automatically operating the machine tool. Other kinds of memory devices can be used instead of the punched tape described, such as a punch card or a magnetic tape, provided a device capable of reading the stored intelligence is also used and connected into the system described. Other codes than the numerical positioning system hereinabove described may also be used.

From the foregoing disclosure it will be recognized that the invention is susceptible of still other modifications without departing from the scope and spirit thereof, and it is to be understood that the invention is not restricted to the specific illustrations herein set forth, except insofar as they are specifically limited by the terms of the appended claims.

What is claimed is:

1. A control circuit comprising, in combination, a controllable device,
   a master starter switch,
   a plural number of selector switches each having first and second contact means with one thereof being open and the other thereof being closed,
   a master switch bank having contacts arranged to correspond to each of said selector switches,
   a movable device in said switch bank engageable with the contacts therein to select a predetermined contact position for selecting a desired one of said selector switches,
   a power operator for said master starter switch,
   means for energizing said master starter switch power operator through the corresponding one of said second contact means and the predetermined contact position of said master switch bank upon the desired selector switch being actuated to open said first contact means and close said second contact means thereof,
   means including said master switch bank to establish a shunt circuit around the actuated open first contact means of the actuated selector switch upon the desired selector switch being actuated,
   and means for energizing said controllable device through the remaining ones of said first contact means and through said shunt circuit upon the desired selector switch being actuated.

2. A control circuit comprising, in combination, a controllable device,
   a master starter switch and a master supplemental switch,
   a plural number of selector switches each having first and second contact means with one thereof being open and the other thereof being closed,
   gang switch means having a master switch bank and a shunt circuit bank,
   contacts in each switch bank arranged to correspond to each of said selector switches,
   a movable device in each of said banks for sequentially engaging the contacts therein to select a predetermined contact position for selecting a desired one of said selector switches,
   a power operator for said master starter switch and said master supplemental switch,
   means for energizing said master starter switch power operator through the corresponding one of said second contact means and the predetermined contact position of said master switch bank upon the desired selector switch being actuated to open said first contact means and close said second contact means thereof,
   means including said gang switch means to establish a shunt circuit around the actuated open first contact means of the actuated selector switch upon the desired selector switch being actuated,
   and means for energizing said controllable device through the remaining ones of said first contact means and through said shunt circuit upon the desired selector switch being actuated.

3. A control circuit comprising, in combination, first and second leads,
   means to connect said leads to a power supply,
   a controllable device,
   a master starter switch,
   a plural number of selector switches each having first and second contact means with one thereof being open and the other thereof being closed,
   said plurality of selector switches arranged to be actuable to open said first contact means and to close said second contact means,
   means connecting said first contact means of said selector switches and said master starter switch in series through said controllable device between said first and second leads, a master switch bank having contacts arranged to correspond to each of said selector switches, a movable device in said switch bank engageable with the contacts therein to select a predetermined contact position for selecting a desired one of said selector switches, a power operator for said master starter switch, means for establishing a circuit from said first to said second lead through the corresponding one of said second contact means and the predetermined contact position of said master switch bank and said master starter switch power operator upon the desired selector switch being actuated to open said first contact means and close said second contact means thereof, and means including said master switch bank establishing a shunt circuit around the actuated open first contact means of the actuated selector switch to establish a connection between said first and second leads through said master starter switch and said controllable device upon the desired selector switch being actuated.

4. A control circuit comprising, in combination, first and second leads, means to connect said leads to a power supply, a controllable device, a master starter switch and master supplemental switch, a plural number of selector switches each having first and second contact means with one thereof being open and the other thereof being closed, said plurality of selector switches arranged to be actuable to open said first contact means and to close said second contact means, means connecting said first contact means of said selector switches and said master starter switch in series through said controllable device between said first and second leads, gang switch means having a master switch bank and a shunt circuit bank, contacts in each switch bank arranged to correspond to each of said selector switches, a movable device in each of said banks for sequentially engaging the contacts therein to select a predetermined contact position for selecting a desired one of said selector switches, a power operator for said master starter switch and said master supplemental switch, means for establishing a circuit from said first to said second lead through the corresponding one of said second contact means and the predetermined contact position of said master switch bank and said master starter switch power operator upon the desired selector switch being actuated to open said first contact means and close said second contact means thereof, and means including said gang switch means establishing a shunt circuit around the actuated open first contact means of the actuated selector switch to establish a connection between said first and second leads through said master starter switch and said controllable device upon the desired selector switch being actuated.

5. A control circuit comprising, in combination, first and second leads, means to connect said leads to a power supply, a controllable device, a master starter switch, a plural number of selector switches each having first and second contact means with one thereof being open and the other thereof being closed, said plurality of selector switches arranged to be actuable to open and first contact means and to close said second contact means, means connecting said first contact means of said selector switches and said master starter switch in series through said controllable device between said first and second leads, a master switch bank having contacts arranged to correspond to each of said selector switches, a movable device in said switch bank engageable with the contacts therein to select a predetermined contact position for selecting a desired one of said selector switches, a power operator for said master starter switch, a shunt circuit for each of said first contact means of said selector switches, each said shunt circuit including the series combination of the respective second contact means and the predetermined contact position of said switch bank, means for establishing a circuit from said first to said second lead through the corresponding one of said second contact means and the predetermined contact position of said master switch bank and said master starter switch power operator upon the desired selector switch being actuated to open said first contact means and close said second contact means thereof, and said shunt circuit for the actuated selector switch establishing a connection between said first and second leads through said master starter switch and said controllable device upon the desired selector switch being actuated.

6. A control circuit comprising, in combination, first and second leads, means to connect said leads to a power supply, a controllable device, a master starter switch and a master suplemental switch, a plural number of selector switches each having first and second contact means with one thereof being open and the other thereof being closed, said plurality of selector switches arranged to be actuable to open said first contact means and to close said second contact means, means connecting said first contact means to said selector switches and said master starter switch in series through said controllable device between said first and second leads, gang switch means having a master switch bank and a shunt circuit bank.

contacts in each switch bank arranged to correspond to each of said selector switches, a movable device in each of said banks engageable with the contacts therein to select a predetermined contact position for selecting a desired one of said selector switches, a power operator for said master starter switch and said master supplemental switch, a shunt circuit for each of said first contact means of said selector switches, each said shunt circuit including the series combination of the respective second contact means, the predetermined contact position of said two switch banks and said master supplemental switch, means for establishing a circuit from said first to said second lead through the corresponding one of said second contact means and the predetermined contact position of said master switch bank and said master starter switch power operator upon the desired selector switch being actuated to open said first contact means and close said second contact means thereof, and said shunt circuit for the actuated selector switch establishing a connection between said first and second leads through said master starter switch and said controllable device upon the desired selector switch being actuated.

7. In a tool pool having a plural number of unlike receptacles formed to accept only the complementary switch operating extension on a corresponding tool, the provision of, first and second leads, means to connect said leads to a power supply, a controllable device including a push button switch and a power operated machine starting device, a master starter switch and a master supplemental switch, a plurality of extension operated switches equal in number to said plural number and each having a normally open and a normally closed contact means, said extension operated switches arranged to be actuated by said switch operating extensions when said tools are placed in the pool in the respective receptacles.

means connecting said normally open contact means of said extension operated switches and said master starter switch in series through said controllable device between said first and second leads, gang switch means having a master switch bank and a shunt circuit bank, contacts in each switch bank arranged to correspond to each of said tools, each of said banks having said plural number of contact positions, a movable device in each of said banks engageable with the contacts therein to select a predetermined contact position for selecting a desired tool, a power operator for said master starter switch and said master supplemental switch, a shunt circuit for each of said normally open contact means in said extension operated switches, each said shunt circuit including the series combination of the respective normally closed contact means, the predetermined contact position of said two banks of said gang switch means and said master supplemental switch, means for establishing a circuit from said first to said second lead through the corresponding one of said normally closed contact means and the predetermined contact position of said master switch bank and said master starter switch power operator upon the desired tool being removed from the tool pool, and said shunt circuit for the actuated extension operated switch establishing a connection from said first lead through said master starter switch to said controllable device upon the desired tool being removed from the tool pool.

8. A control circuit comprising, in combination, first and second leads, means to connect said leads to a power supply, a controllable device, a master starter switch and a master supplemental switch, a plural number of selector switches each having first and second contact means with one thereof being open and the other thereof being closed, said plurality of selector switches arranged to be actuable to open said first contact means and to close said second contact means, means connecting said first contact means of said selector switches and said master starter switch in series through said controllable device between said first and second leads, a stepping switch having a master switch bank and a shunt circuit bank, contacts in each switch bank arranged to correspond to each of said selector switches, each of said banks of the stepping switch having said plural number of contact positions, a movable device in each of said banks for sequentially engaging the contacts therein, stepping means for steppingly moving said movable device for forming a sequential connection with said contacts to position said movable devices at a predetermined contact position for selecting a desired one of said selector switches, a power operator for said master starter switch and said master supplemental switch, a shunt circuit for each of said first contact means of said selector switches, each said shunt circuit including the series combination of the respective second contact means, the predetermined contact position of said two banks of said stepping switch and said master supplemental switch, means for establishing a circuit from said first to said second lead through the corresponding one of said second contact means and the predetermined contact position of said master switch bank and said master starter switch power operated upon the desired selector switch being actuated to open said first contact means and close said second contact means thereof, and said shunt circuit for the actuated selector switch establishing a connection between said first and second leads through said master starter switch and said controllable device upon the desired selector switch being actuated.

9. In a tool pool having a plural number of unlike receptacles formed to accept only the complementary switch operating extension on a corresponding tool, the provision of, first and seconds leads, means to connect said leads to a power supply, a controllable device including a push button switch and a power operated machine starting device, a master starter switch and a master supplemental switch, a plurality of extension operated switches equal in number to said plural number and each having a normally open and a normally closed contact means, said extension operated switches arranged to be actuated by said switch operating extensions when said tools are placed in the pool in the respective receptacles, means connecting said normally open contact means of said extension operated switches and said master starter switch in series through said controllable device between said first and second leads, a stepping switch having a master switch bank and a shunt circuit bank, contacts in each switch bank arranged to correspond to each of said tools, each of said banks of the stepping switch having said plural number of contact positions, a movable device in each of said banks for sequentially engaging the contacts therein, stepping means for steppingly moving said movable device for forming a sequential connection with said contacts to position said movable devices at a predetermined contact position for selecting a desired tool, a power operator for said master starter switch and said master supplemental switch, a shunt circuit for each of said normally open contact means in said extension operated switches, each said shunt circuit including the series combination of the respective normally closed contact means, the predetermined contact position of said two banks of said stepping switch and said master supplemental switch, means for establishing a circuit from said first to said second lead through the corresponding one of said normally closed contact means and the predetermined contact position of said master switch bank and said master starter switch power operator upon the desired tool being removed from the tool pool, and said shunt circuit for the actuated extension operated switch establishing a connection from said first lead through said master starter switch to said controllable device upon the desired tool being removed from the tool pool.

10. In a tool pool having a plural number of unlike receptacles formed to accept only the complementary switch operating extension on a corresponding tool, the provision of, a power supply with a power supply conductor and a return conductor, a master starter switch and a master supplemental switch, a plurality of extension operated switches each having a normally open and a normally closed contact means, said extension operated switches arranged to be actuated by said switch operating extensions when said tools are placed in the pool in the respective receptacles, said normally open contact means of said extension operated switches providing a closed connection from the power supply conductor to said master starter switch when all said tools are in place in the tool pool, a stepping switch having a master switch bank and a supplemental circuit bank, contacts in each switch bank arranged to correspond o each of said tools, each of said banks of the stepping switch having said plural number of contact positions, a movable device in each of said banks for sequentially engaging the contacts therein, stepping means for steppingly moving said movable devices for forming a sequential connection with said contacts to position said movable devices at a predetermined position for selecting a desired tool, a power operated master switch operator, means for connecting the power supply conductor through the corresponding one of said normally closed contact means with said master switch operator upon the desired tool being removed from the tool pool, means comprising a selected contact in said supplemental circuit switch bank for connecting said master supplemental switch with said master starter switch upon the stepping switch movable devices being moved to said predetermined position, a power line having a power operated machine starting device connected therein, and means for connecting said starting device with said master starter switch.

11. In a tool pool having a plural number of unlike receptacles formed to accept only the complementary switch operating extension on a corresponding tool, the provision of, a power supply with a power supply conductor and a return conductor, a master starter switch and a master supplemental switch, a plurality of extension operated switches each having a normally open and a normally closed contact means, said extension operated switches arranged to be actuated by said switch operating extensions when said tools are placed in the pool in the respective receptacles, said normally open contact means of said extension operated switches providing a closed connection from the power supply conductor to said master starter switch when all said tools are in place in the tool pool, a stepping switch having a master switch bank and a supplemental circuit bank, contacts in each switch bank arranged to correspond to each of said tools, each of said banks of the stepping switch having said plural number of contact positions, a movable device in each of said banks for sequentially engaging the contacts therein, stepping means for steppingly moving said movable devices for forming a sequential connection with said contacts to position said movable devices at a predetermined position for selecting a desired tool, a power operated master switch operator, means for connecting the power supply conductor through the corresponding one of said normally closed contact means with said master switch operator upon the desired tool being removed from the tool pool, means comprising a selected contact in said supplemental circuit switch bank for connecting said master supplemental switch with said master starter switch upon the stepping switch movable devices being moved to said predetermined position, a power line having a power operated machine starting device connected therein, and means for connecting said starting device with said master starter switch.

References Cited by the Examiner

UNITED STATES PATENTS

| 2,898,483 | 8/1959 | Muller | 307—115 |
| 2,902,707 | 9/1959 | Bearer | 317—139 X |

NEIL C. READ, *Primary Examiner.*

D. YUSKO, *Assistant Examiner.*